April 28, 1942.  C. E. TACK  2,280,868
BRAKE ARRANGEMENT
Filed Sept. 23, 1939  4 Sheets-Sheet 1
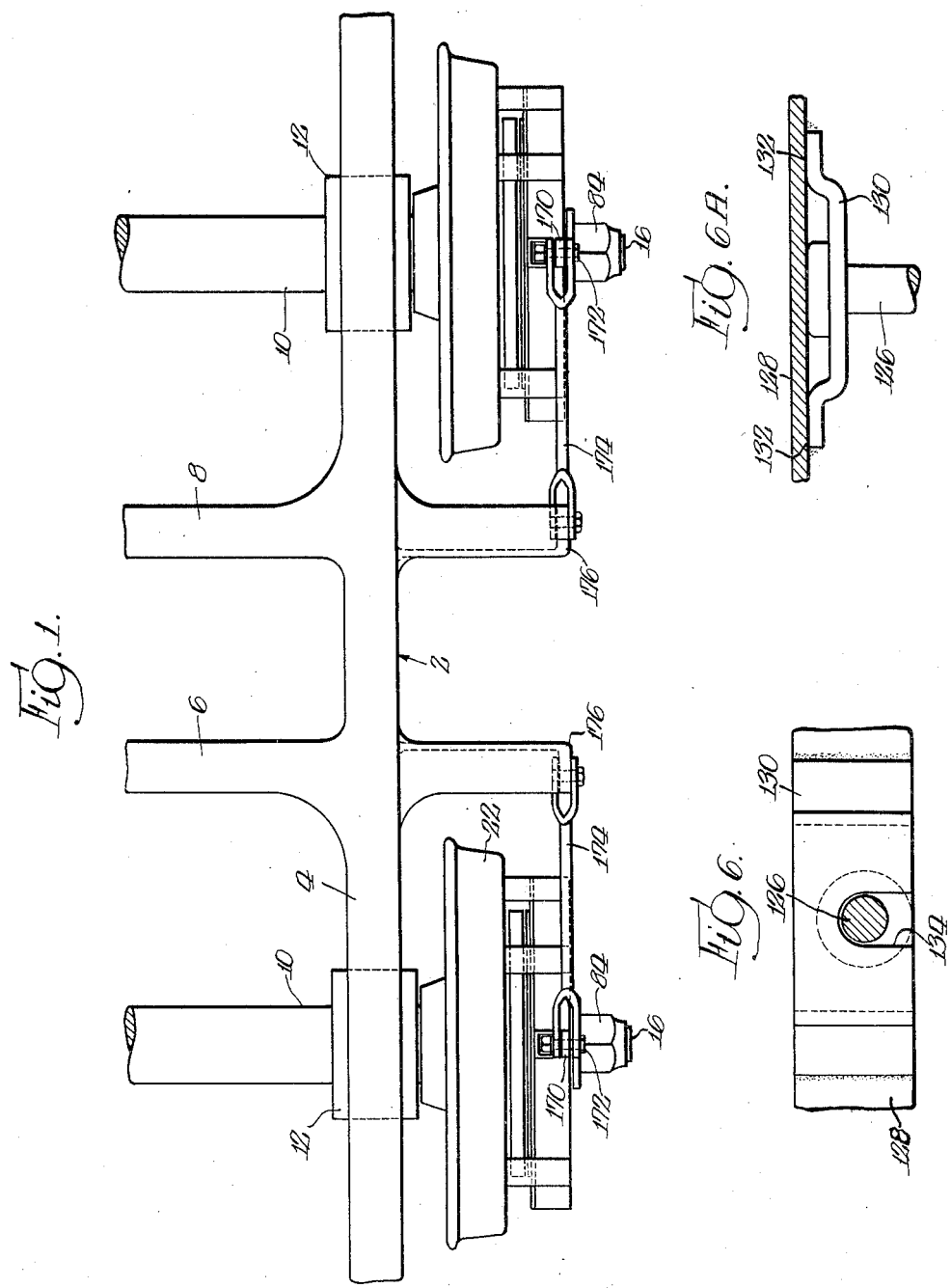
INVENTOR.
Carl E. Tack,
BY
ATTORNEY.

April 28, 1942. C. E. TACK 2,280,868
BRAKE ARRANGEMENT
Filed Sept. 23, 1939 4 Sheets-Sheet 2
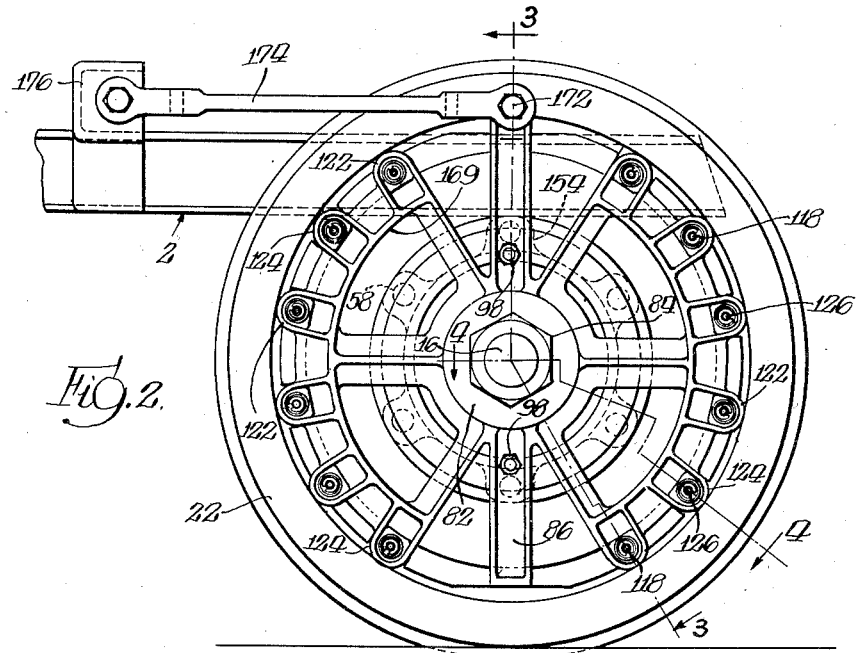
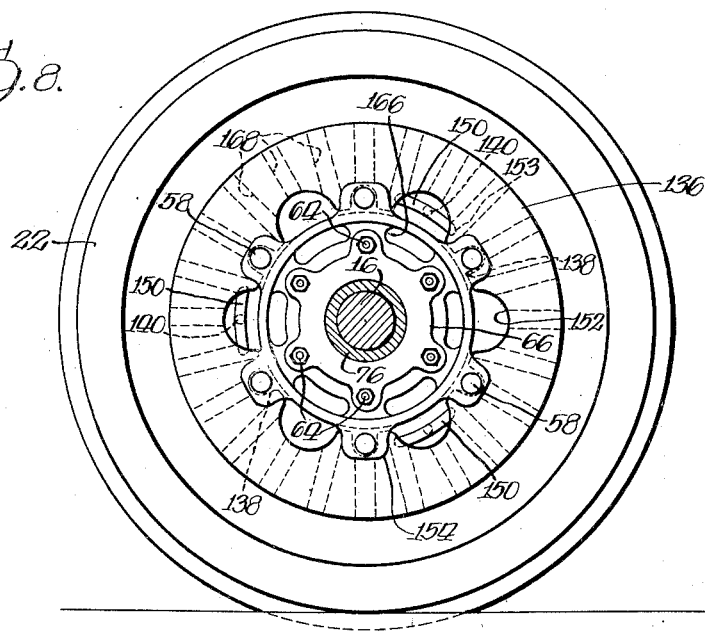
INVENTOR.
Carl E. Tack,
BY Orin O. B. Garner
ATTORNEY.

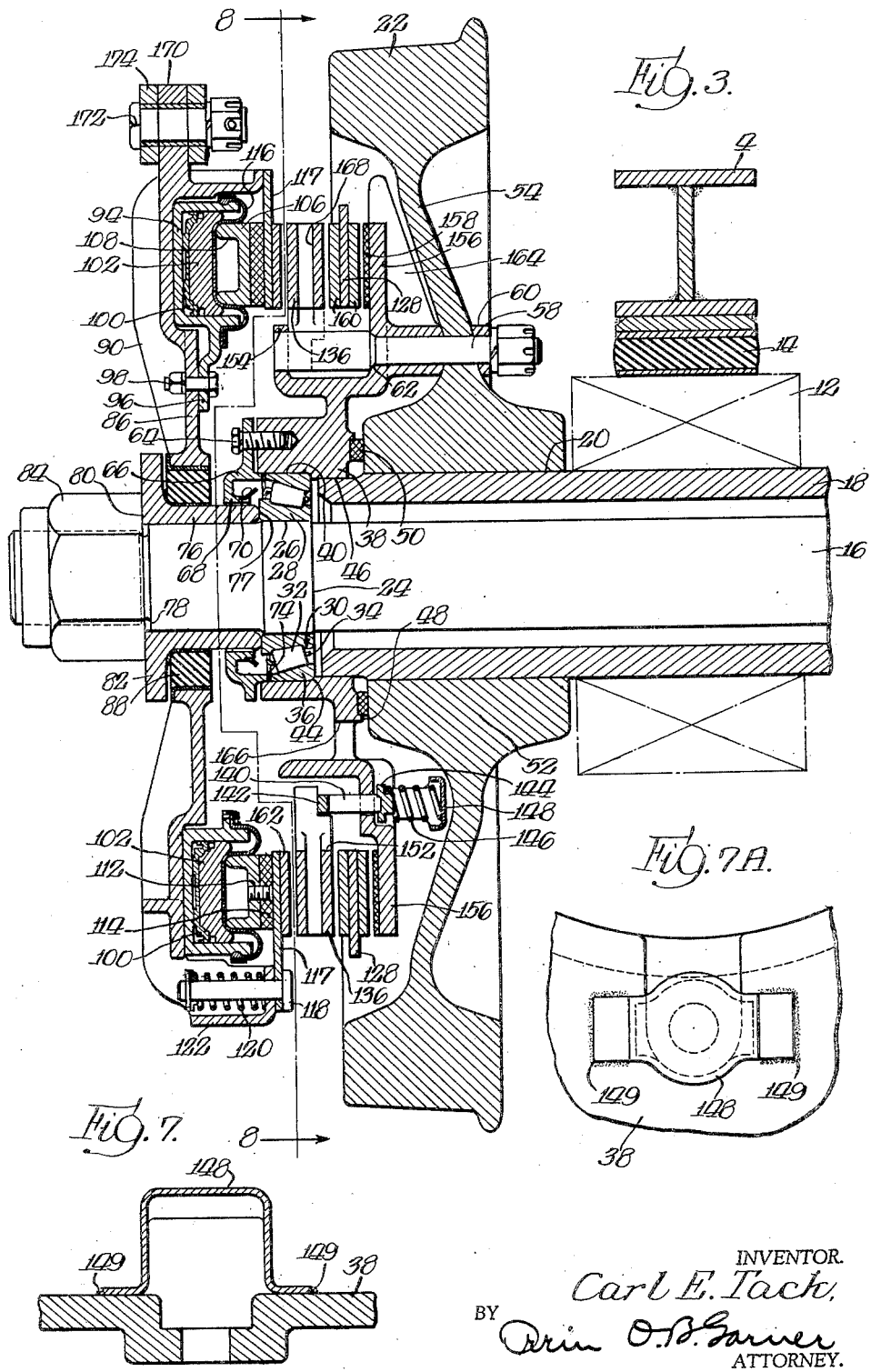

April 28, 1942.    C. E. TACK    2,280,868
BRAKE ARRANGEMENT
Filed Sept. 23, 1939    4 Sheets-Sheet 4
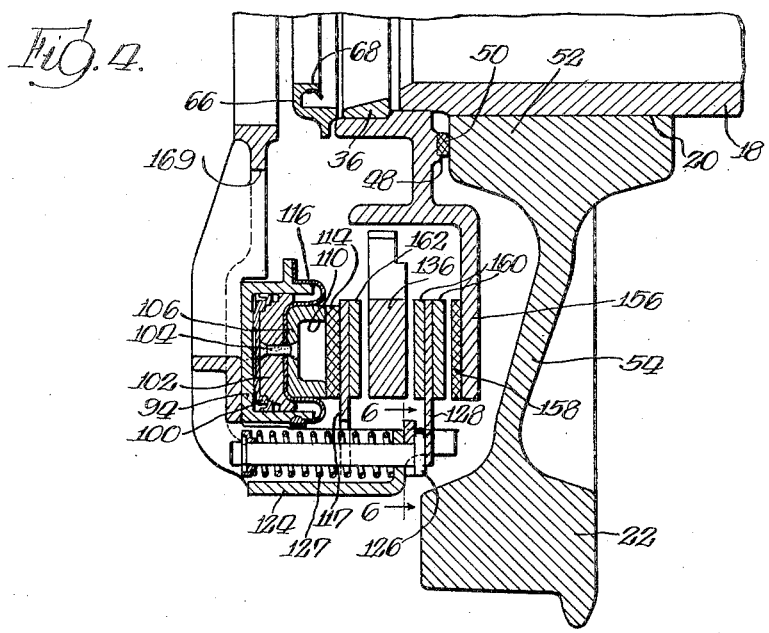
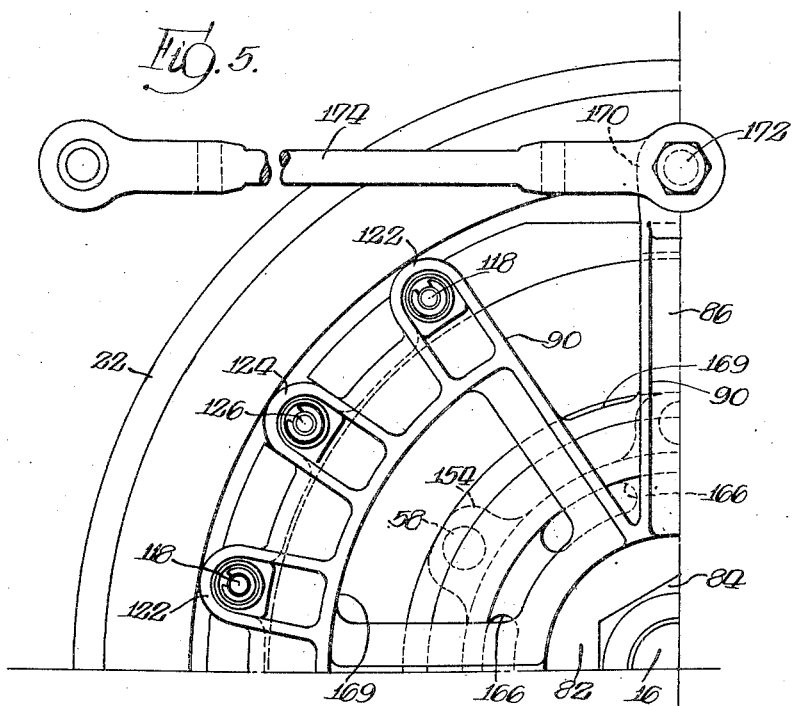
INVENTOR.
Carl E. Tack,
BY Orrin O. B. Garner
ATTORNEY.

Patented Apr. 28, 1942

2,280,868

UNITED STATES PATENT OFFICE 2,280,868

BRAKE ARRANGEMENT

Carl E. Tack, Chicago, Ill., assignor to American Steel Foundries, Chicago, Ill., a corporation of New Jersey Application September 23, 1939, Serial No. 296,218

39 Claims. (Cl. 188—153)

My invention relates to vehicle brakes and more particularly to a brake arrangement having rotors and stators brought axially into frictional engagement with each other, said device being adapted for use on either railway or land vehicles. The modification illustrated here is shown as applied to a railway vehicle having an inboard antifriction journal box.

With the present speeds attained by modern railway trains, brake arrangements have been developed which afford braking surfaces in addition to those surfaces conventionally used for braking means. Such an arrangement may include the use of stationary and rotary discs supported outboard the wheel with power means for moving them into frictional engagement. My invention contemplates such a device.

An object of my invention is to provide a braking arrangement wherein the braking surfaces are arranged on discs partially supported by the wheel.

Another object of my invention is to provide braking means wherein stators may be supported upon a non-rotating inner axle and rotors on a rotating outer axle.

Yet another object of my invention is to provide such a braking arrangement whereby the antifriction bearings used between the axles may have means for adjustment at the projecting end of the inner axle.

A further object of my invention is to provide braking means whereby the power means for actuating the brakes may be supported at the projecting end of the inner axle.

A still further object of my invention is to provide a braking arrangement which is adapted for use on trucks supported by inboard bearing axles.

Various other objects and features of my novel design are more clearly set forth in the accompanying specification and associated drawings as well as in the attached claims.

Referring to the drawings Figure 1 is a top plan view of a truck showing my novel braking means;

Figure 2 is a fragmentary side elevation of the structure shown in Figure 1;

Figure 3 is an enlarged sectional view of one of the wheel and axle assemblies shown in Figure 1, the section being taken substantially in the transverse planes indicated by line 3—3 of Figure 2;

Figure 4 is a sectional view taken along the line 4—4 of Figure 2;

Figure 5 is a quarter side elevation taken from the left of Figure 3;

Figure 6 is a view showing the means of connecting the inboard stator to the release spring plunger, taken along the line 6—6 of Figure 4, and Figure 6A is a top view showing said connection;

Figure 7 is a view showing my method of housing the release spring for the outboard rotor, and Figure 7A is a top view thereof; and Figure 8 is a sectional view taken along the line 8—8 of Figure 3 showing in more detail the outboard rotor.

Describing my drawings in more detail, the truck frame generally indicated at 2 comprises the side member 4 with the spaced transoms 6 and 8 formed integrally therewith serving as the usual means of support for the bolster (not shown), said frame being supported by the wheel and axle assemblies generally indicated as at 10, 10. The inboard journal box 12 may be of the usual antifriction form and supports the side member 4 having the usual means of pedestal jaws (not shown) for connection thereto, and which may be mounted on resilient material as at 14.

The wheel and axle assembly 10 includes a non-rotating inner axle 16 having a rotating outer axle 18 sleeved thereover, the said outer axle having press fitted as at 20 adjacent its end the wheel 22. Slightly beyond the end of the outer axle 18 the inner axle 16 may be formed with the shoulder 24 upon which is press fitted as at 26 the inner race or cone 28 of the antifriction bearing generally indicated at 30. The antifriction bearing 30 has rollers 32, 32 held in normal spaced relationship by the cage 34 and has the outer race or cup 36 press fitted in the ring casting 38 as at 40, said outer race having abutment against the shoulder 44 of the casting.

The ring casting 38 has a light press fit on the end of the outer axle 18 as at 46 and has a shoulder 48 on its inboard face forming a seat for the annular gasket 50 which abuts the outboard face of the wheel hub 52. Adjacent the wheel hub 52 the wheel plate 54 carries the bolts 58, 58 having the washers 60, 60 on its inboard side with contours conforming to the wheel plate 54. The bolts 58, 58 have elongated heads with a tapered shoulder as at 62 providing means for tightly retaining the ring casting 38. Outboard the ring casting 38 may be the stud bolts 64, 64 securing the closure plate 66 to said casting. On the closure plate 66 may be formed an inwardly directed flange 68 carrying an oil deflector 70. A gasket 74 may be tightly fitted between said plate and the outer race 36 to prevent the escape of lubricant.

Adjacent the outer end of the inner axle 16 I may provide the sleeve 76 having a sliding fit thereon with abutment as at 77 with the inner race 28 and extending slightly beyond the shoulder 78 defining the threaded end of the inner axle so as to permit the outboard end of the sleeve 76 to have annular abutment as at 80 with the adjusting nut 84 on said threaded end, thus providing means for easy adjustment of the antifriction bearing 30. Adjacent the flange 82 of the sleeve 76 may be press fitted the disc or cylinder housing 86 having resilient mounting as at 88 and having the reinforcing ribs 90, 90. Adjacent the outer perimeter of the cylinder housing 86 may be seated the ring cylinder 94 having a flange 96 providing with the nut and bolt assemblies generally indicated at 98, 98 means for securing the ring cylinder to the cylinder housing. Within the ring cylinder is the packing ring 100 and the ring-type piston 102 having secured to it by rivets as at 104 (Figure 4) the member 106. The member 106 may have recesses 108 (Figure 3) and 110 (Figure 4) formed alternately from opposite sides, and secured to its inboard side with screws as at 112 (Figure 3) is a relatively heavy insulating material 114 to prevent heat generated by the braking action from being transmitted to the piston 102. Between the member 106 and the piston may be seated a flexible member 116 extending without the cylinder 94 to act as a dirt protector for the piston.

Abutting the insulating material 114 may be the outboard stator 117 supported from the outer perimeter of the cylinder housing 86 at spaced intervals by the plungers 118, 118 (Figure 3) having compression springs 120, 120 sleeved thereover within the inwardly directed release spring housings 122, 122 integrally formed with said cylinder housing 86. Alternating with the said housings 122, 122 may be the release spring housings 124, 124 (Figure 4) integrally formed with the cylinder housing 86 each having a plunger 126 enclosed therein with a compression spring 127 sleeved thereover, thus providing means for supporting the inboard stator 128 as is best shown in Figures 6 and 6A. The strap 130 is welded to the inboard stator 128 as at 132, 132, and may be slotted as at 134 to receive the plunger 126. The compression springs 120, 120 and 127, 127 provide independent means for the respective stators to maintain their normal released positions.

Interleaved between the stators 106 and 128 may be the outboard rotor 136 having slots 138, 138 permitting axial movement of said rotor on the elongated heads of the bolts 58. The rotor 136 is maintained in its normal released position by the plungers 140, 140 (Figure 3) each having abutment as at 142 with said rotor and having on its inboard end the seat 144 for the compression spring 146, partially enclosed in the U-shaped housing 148 welded as at 149 to the inboard face of the ring casting 38 as is best shown in Figures 7 and 7A. The plunger 140 has a special T-shaped head as indicated at 150 (Figure 8), made necessary because of the slots 152, 152 in the inner perimeter of the rotor 136, said T-shaped heads bridging said slots to afford bearing as at 153 against said rotor 136. In assembling or dismantling, said rotor may be turned so that the slots 152, 152 are aligned with the bolt supporting lugs 154, 154 (Figure 3), thus enabling it to be easily applied or removed over the ring casting 38 without disturbing said ring casting. The lugs 154, 154 are integrally formed with the ring casting 38 and are aligned with the bolts 58 to provide bearing therefor.

The inboard rotor 156 may be formed integrally with the casting 38 and may have on its outboard face the brake lining or wear plate 158. On opposite sides of the stator 128 may be wear plates 160, 160 and on the inboard face of the stator 117 may be the wear plate 162.

To provide means for air cooling, the casting 38 has formed integrally with it the spaced fan ribs 164, 164 and the openings 166, 166; the rotor 136 has radially formed slots 168, 168 (Figure 8) and the afore-described slots 152, 152 which provide means for circulating the air about the rotors and stators. Also in the cylinder housing 86 there may be the openings 169, 169 which permit passage of the air into the rotor and stator assembly. The lug 170 is formed on the outer perimeter of the cylinder casting 86 to provide a pivotal connection as at 172 with the torque arm 174 which is secured at its other end to the bracket 176 formed on the truck frame.

In operation, actuation of the power means moves the ring piston 102 in an inboard direction against the stator 116 bringing it into engagement with the rotor 136 and successively moving axially the rotor 136 and the stator 128, thus bringing the rotor and stators into a pile against the rotor 156 with their brake surfaces in frictional engagement with each other. Release of the power means permits the rotors and stators to assume their normal positions by operation of the release springs associated with the stators 128 and 117 and the rotor 136 as already described.

It is to be understood that I do not wish to be limited by the exact embodiment of the device shown which is merely by way of illustration and not limitation as various and other forms of the device will of course be apparent to those skilled in the art without departing from the spirit of the invention or the scope of the claims.

I claim:

1. In a vehicle, a frame member, a supporting wheel and axle assembly, a journal box inboard said wheel, said assembly including a non-rotating axle, a rotating axle sleeved thereover, a wheel fitted on said rotating axle, braking means comprising interleaved rotors and stators supported from said rotating axle and non-rotating axle respectively, means for moving said rotors and stators axially, said means comprising a disc resiliently mounted on said non-rotating axle, a cylinder carried by said disc, a piston therein, and flexible dirt protecting means for said cylinder.

2. In a vehicle, a frame member, a supporting wheel and axle assembly, a journal box inboard said wheel, said assembly including a non-rotating axle, a rotating axle sleeved thereover, a wheel fitted on said rotating axle, braking means comprising interleaved rotors and stators supported from said rotating axle and non-rotating axle respectively, actuating means for said rotors and stators, said actuating means comprising a disc resiliently mounted on said non-rotating axle, a cylinder carried by said disc, a piston therein, and insulating means interposed between said piston and certain of said stators.

3. In a vehicle, a frame member, a supporting wheel and axle assembly, an inboard journal box on said wheel and axle assembly, said assembly including a non-rotating axle, a rotating axle sleeved thereover, a wheel fitted on said rotating axle, braking means comprising interleaved rotors and stators, actuating means for said rotors and stators, said actuating means comprising a disc resiliently mounted on said non-rotating axle, a cylinder carried by said disc, a piston therein, and insulating material interposed between a casting and one of said stators.

4. In a vehicle, a frame member, a supporting wheel and axle assembly, a journal box inboard said wheel, said assembly including a non-rotating axle, a rotating axle sleeved thereover, a wheel fitted on said rotating axle, braking means comprising interleaved rotors and stators supported from said rotating axle and non-rotating axle respectively, and actuating means for moving said rotors and stators axially, said actuating means comprising a disc resiliently mounted on said non-rotating axle, a cylinder carried by said disc, and a piston therein.

5. In a vehicle, a frame member, an inboard journal box, a supporting wheel and axle assembly, said assembly comprising a rotating outer axle, a wheel fitted thereon, a non-rotating inner axle, an antifriction bearing mounted on said inner axle, braking means comprising a rotor supported from said outer axle, a stator supported from said inner axle, and means for moving said stators and rotors into engagement, said means comprising a slidable sleeve supported on said inner axle in abutment with said antifriction bearing, and a cylinder resiliently mounted on said sleeve.

6. In a railway vehicle, a wheel and axle assembly, wheels supported thereon, an axle projecting beyond said wheels, resilient means and stop means on said axle, members carried on said resilient means, braking means supported respectively between said wheels and said members, and power means at each end of said assembly operable to bring said braking means into frictional engagement, each of said power means reacting against said members to place said resilient means in shear and bring said members into abutment with said stop means whereby said reaction is resisted by tension of said axle.

7. In a vehicle, a frame member supported from an inboard journal box, a wheel and axle assembly including an inner axle, an outer axle sleeved thereover, a wheel fitted on said outer axle, braking means comprising a rotor supported from said wheel, a stator supported from said inner axle, and means for actuating said braking means, said actuating means including a resiliently mounted cylinder supported from said inner axle, and a torque arm connecting said housing and said frame member.

8. In a vehicle, a frame, a supporting wheel and axle assembly comprising an inner axle, an outer axle, a wheel on said outer axle, rotor carrying means supported on said outer axle outwardly of said wheel, an antifriction bearing between said inner axle and said carrying means, stators and rotors supported respectively from said inner axle and said carrying means, and operating means supported on said inner axle for moving said stators and rotors into engagement.

9. In a vehicle, a wheel and axle assembly comprising an outer axle with a wheel supporting braking means, an inner axle, stop means and resilient means on said inner axle, a member supported on said inner axle through said resilient means, power means and other braking means supported on said member, said power means being operable to bring said respective braking means into engagement with each other by reaction against said member whereby said resilient means is placed in shear and said member brought into abutment against said stop means.

10. In a railway vehicle, a wheel and axle assembly comprising an outer axle with wheels, an inner axle, stop means and resilient means on said inner axle outboard of said wheels, members supported on said resilient means, braking means supported respectively from said members and said wheels, power means supported on said members operable to bring said braking means at each end of said assembly into engagement with each other by reaction against said members respectively whereby said resilient means are placed in shear and said members brought into abutment against said stop means.

11. In a vehicle, a frame member, a supporting wheel and axle assembly, a journal box inboard said wheel, braking means comprising a plurality of alternately arranged rotors and stators, and operable means for bringing said rotors and stators into frictional engagement with each other, said operable means comprising a resiliently supported cylinder housing, a ring cylinder carried by said housing, and a member connecting said housing and said frame member.

12. In a vehicle, a frame member, an inboard journal box, a supporting wheel and axle assembly, said assembly comprising a rotating outer axle, a wheel fitted thereon, an antifriction bearing unit, a non-rotating inner axle mounted on said unit, braking means comprising rotors supported from said wheel and outer axle, stators supported from said inner axle, and means for moving said stators and rotors into frictional engagement.

13. In a vehicle, a frame member, an inboard journal box, a supporting wheel and axle assembly, said assembly comprising a rotating outer axle, a wheel fitted thereon, an antifriction bearing unit, a non-rotating inner axle mounted on said unit, braking means comprising rotors supported from said wheel and outer axle, stators supported from said inner axle, and means for axially moving said stators and rotors including cylinder and release means.

14. In a vehicle, a wheel and axle assembly comprising an inner axle, an outer axle, a wheel thereon, rotor means on said outer axle outwardly of said wheel, antifriction bearing between said inner axle and said rotor means, a member sleeved over said inner axle in abutment with said bearing for adjustment thereof, stator means resiliently supported from said member, and means for axially moving said rotor means and stator means.

15. In a vehicle, a frame member, a supporting wheel and axle assembly, a journal box inboard said wheel, braking means comprising a plurality of alternately arranged rotors and stators, and operable means for bringing said rotors and stators into frictional engagement with each other, said operable means comprising a resiliently supported cylinder housing, and a cylinder carried by said housing.

16. In a vehicle, a frame member, a supporting wheel and axle assembly, a journal box inboard said wheel, said assembly including a non-rotating axle, a rotating axle sleeved thereover, a wheel fitted on said rotating axle, braking means comprising interleaved rotors and stators supported from said rotating axle and non-rotating axle respectively, and actuating means for said rotors and stators.

17. In a vehicle, a frame member supported from an inboard journal box, a wheel and axle assembly including an inner axle, an outer axle sleeved thereover, a wheel fitted on said outer axle, braking means comprising a rotor supported from said wheel, a stator supported from said inner axle, and operating means comprising a cylinder housing resiliently and slidably supported on said inner axle.

18. In a vehicle, a wheel and axle assembly comprising an inner axle, an outer axle, a wheel on said outer axle, rotor means supported on said outer axle outwardly of said wheel, antifriction bearing between said inner axle and said rotor means, stator means supported on said inner axle, and operating means resiliently supported on said inner axle for said rotors and stators.

19. In a vehicle, a wheel and axle assembly comprising an inner axle, an outer axle, a wheel thereon, rotor means on said outer axle outwardly of said wheel, antifriction bearing between said inner axle and said rotor means, a member sleeved over said inner axle in abutment with said bearing for adjustment thereof, and a stator and operating means supported from said member.

20. In a vehicle, a frame member, a supporting wheel and axle assembly, a journal box inboard said wheel, braking means comprising a plurality of alternately arranged rotors and stators, and operable means for bringing said rotors and stators into frictional engagement with each other, said operable means having resilient mounting on said axle.

21. In a vehicle, a frame member supported from an inboard journal box, a wheel and axle assembly including an inner axle, an outer axle sleeved thereover, a wheel fitted on said outer axle, braking means comprising a rotor supported from said wheel, a stator supported from said inner axle, and means for actuating said braking means.

22. In a vehicle, a journal box supporting a frame member, a wheel and axle assembly comprising an inner axle, an outer axle journaled in said box, a wheel on said outer axle, rotor means supported on said outer axle outwardly of said wheel, antifriction bearing between said inner axle and said rotor means, stator means supported on said inner axle, and means for operating and releasing said rotor and stator means.

23. In a railway vehicle, a wheel and axle assembly comprising an outer axle with a wheel thereon, brake carrying means supported on said axle against said wheel, an inner axle antifrictionally supported from said brake carrying means, a brake carrying member resiliently supported from said inner axle, and power means supported on said member.

24. In a vehicle, a frame member supported from an inboard journal box, a wheel and axle assembly including an inner axle, an outer axle sleeved thereover and journaled in said box, a wheel fitted on said outer axle, braking means outboard said wheel comprising a rotor supported from said wheel, a stator supported from said inner axle, means for actuating said braking means, and release means for said rotor and stator supported respectively from said wheel and said inner axle.

25. In a vehicle, a frame member supported from an inboard journal box, a wheel and axle assembly including an inner axle, an outer axle sleeved thereover and journaled in said box, a wheel fitted on said outer axle, braking means comprising a rotor supported from said wheel, a stator supported from said inner axle, means for actuating said braking means, and release means for said rotor and stator outwardly of said wheel.

26. In a vehicle, a wheel and axle assembly comprising a wheel, rotating and non-rotating axles, a frame supporting member journaled on said rotating axle, rotor carrying means supported on said rotating axle, a stator and a rotor supported respectively from said non-rotating axle and said carrying means, annular operating means supported on said non-rotating axle for moving said stator and rotor into engagement, and release means on said carrying means for said rotor.

27. In a vehicle, a wheel and axle assembly comprising a wheel, rotating and non-rotating axles, a frame supporting member journaled on said rotating axle, brake carrying means supported on said rotating axle, braking elements and associated release means supported from said nonrotating axle and said carrying means, and annular operating means supported on said non-rotating axle for bringing said braking elements into frictional engagement.

28. In a vehicle, a frame member, a wheel and axle assembly including a wheel and rotating and non-rotating axles, braking means comprising a rotor supported from said wheel, a stator supported from said non-rotating axle, and operating means comprising a cylinder housing resiliently and slidably supported on said nonrotating axle.

29. In a vehicle, a frame member, a wheel and axle assembly including a wheel and rotating and non-rotating axles, braking means comprising a rotor supported from said wheel, a stator supported from said non-rotating axle, operating means comprising a cylinder housing resiliently and slidably supported on said nonrotating axle, and a torque arm connecting said housing and said frame member.

30. In a vehicle, a frame member, a wheel and axle assembly including a wheel and rotating and non-rotating axles, braking means comprising a rotor supported from said wheel, a stator supported from said non-rotating axle, operating means for moving said rotor and stator into frictional engagement including a resiliently mounted cylinder encircling said axle, and an annular dust protector for said cylinder.

31. In a vehicle, a frame member, a wheel and axle assembly including a wheel and rotating and non-rotating axles, braking means comprising a rotor supported from said wheel, a stator supported from said non-rotating axle, operating means for moving said rotor and stator into frictional engagement including a resiliently supported annular cylinder housing, and release means on said housing for said stator.

32. In a vehicle, a wheel and axle assembly comprising a wheel, rotating and non-rotating axles, brake carriers supported from each axle, rotors supported from one of said brake carriers and stators supported from the other of said brake carriers, annular power means on one of said carriers for actuating said rotors and stators, and alternately spaced release means for respective stators on one of said brake carriers.

33. In a vehicle, a wheel and axle assembly comprising a wheel, rotating and non-rotating axles, a frame supporting member on said rotating axle inboard said wheel, brake carriers supported outboard said wheel by each axle, rotors supported from one of said brake carriers and stators supported from the other of said brake carriers, power means on one of said carriers for actuating said rotors and stators, and a resilient mounting for said last mentioned carrier.

34. In a vehicle, a wheel and axle assembly comprising a wheel, rotating and non-rotating axles, a frame supporting member journaled on said rotating axle inboard said wheel, brake carriers supported outboard said wheel by each axle, rotors supported from one of said brake carriers and stators supported from the other of said brake carriers, power means on one of said carriers for actuating said rotors and stators, and a sleeve slidably supporting said lastmentioned carrier.

35. In a vehicle, a wheel and axle assembly comprising a wheel, rotating and non-rotating axles, brake carriers supported from each axle, rotors supported from one of said brake carriers and stators supported from the other of said brake carriers, power means on one of said carriers for actuating said rotors and stators, and alternately spaced release means for respective stators on said last mentioned carrier outwardly thereof.

36. In a vehicle, a frame member, a wheel and axle assembly comprising a wheel, rotating and non-rotating axles, brake carriers supported from each axle, braking elements and release means therefor supported from each of said carriers, resiliently mounted operable means for bringing said elements into frictional engagement, and a torque arm connecting said frame member and said lastmentioned carrier.

37. In a vehicle, a frame member, a supporting wheel and axle assembly, braking means comprising a rotatable braking element supported from said wheel, a stationary braking element supported from said axle, actuating means for bringing said elements into frictional engagement including a resiliently mounted cylinder encircling said axle and an annular flexible dirt protector for said cylinder and secured thereto.

38. In a vehicle, a wheel and axle assembly comprising an inner axle, an outer axle, a wheel thereon, rotor means on said outer axle outwardly of said wheel, antifriction bearing between said inner axle and said rotor means, a member sleeved over said inner axle in abutment with said bearing for adjustment thereof, and a stator and operating means resiliently supported from said member.

39. In a vehicle, a wheel and axle assembly comprising a wheel, rotating and non-rotating axles, braking elements supported from each of said axles, power means operable to move said elements into a compact pile for frictional engagement, and stop means and resilient means on one of said axles for taking the reaction of said power means.

CARL E. TACK.